United States Patent
Katoh

[11] Patent Number: 5,880,424
[45] Date of Patent: Mar. 9, 1999

[54] SPOT WELDING HEAD

[75] Inventor: Kanami Katoh, Sakai, Japan

[73] Assignee: Illinois Tool Works Inc., Glenview, Ill.

[21] Appl. No.: 822,137

[22] Filed: Mar. 17, 1997

[30] Foreign Application Priority Data

Mar. 15, 1996 [JP] Japan .................................. 8-059167

[51] Int. Cl.⁶ .................................................. B23K 11/11
[52] U.S. Cl. .......................................... 219/86.7; 219/87
[58] Field of Search .................................. 219/87, 86.25, 219/86.7, 88

[56] References Cited

U.S. PATENT DOCUMENTS

| | | | |
|---|---|---|---|
| 3,128,367 | 4/1964 | Darmon et al. | 219/87 |
| 3,439,606 | 4/1969 | Bursik et al. | 219/87 |
| 4,349,718 | 9/1982 | Carota et al. | 219/87 |
| 4,724,294 | 2/1988 | Klein | 219/87 |

FOREIGN PATENT DOCUMENTS 2-274383  8/1990  Japan .
7-31891  7/1995  Japan .

*Primary Examiner*—Clifford C. Shaw
*Attorney, Agent, or Firm*—Schwartz & Weinrieb

[57] ABSTRACT

A spot welding head comprises a spot electrode 6, a spot electrode supporter 3 holding the electrode 6 on its tip, a base member 2 holding the supporter 3 in such a manner that the supporter 3 can swing on a first pin 4, a frame 1 holding the base member 2 in such a manner that the member 2 can swing on a pivot pin 14 as a second pin, a guide 17 for guiding the base member 2 relative to the frame 1 in such a manner that the member 2 can slide longitudinally, a first actuator 5 connected at its one end to the supporter 3 for swinging the supporter 3 relative to the base member 2 when a steel strap is spot-welded, and a second actuator 9 connected at its one end to the frame 1 and at its other end to the base member 2 for swinging or sliding the member 2 relative to the frame.

12 Claims, 7 Drawing Sheets

SPOT WELDING HEAD

FIELD OF THE INVENTION

The present invention relates to a spot welding head for spot-welding the overlapping portions of a steel strap wound by more than one turn and tightened around a steel strip coil, a wire coil, a group of pipes and rods/bars, a pile of plates, or the like which should be bound.

BACKGROUND OF THE INVENTION

Known is a conventional spot welding head of the aforenoted type for spot-welding a steel strap longitudinally at one, two or three spots at regular intervals (Japanese Patent Publication H.2-274383).

There is another spot welding head for spot-welding a steel strap laterally at two or more spots at one or more predetermined intervals (Japanese Utility Model Publication H.7-31891).

Before these spot welding heads were developed, there were only available spot welding heads exclusively for spot welding at only one spot or longitudinally in only one line. With regard to those steel straps which were spot-welded at only one spot or longitudinally in only one line, however, if tensile force is applied to each of the straps from both sides of the weld spot, the welded minute area behaves in such a manner that it turns perpendicularly to the direction of tension. This causes a bending moment to act on the welded portion. As a result, relatively small forces broke some of such welded portions.

Therefore, spot welding heads for multi-point spot welding as mentioned above have been provided, and measures have been taken so that no bending moments act on the spot-welded portions, or so that the portions are sufficiently secure against bending moments, if any.

With regard to the above multi-point spot welding, if a tensile force is applied to a welded steel strap, a slight bending moment acts on the welded portions on both sides. In addition, because the strap is welded at multiple spots in a line within a size limited for compactness of the apparatus, the distances between the weld spots are shortened. Therefore, the spot welding temper hardening extremely reduces the allowable bending stress in the directions along the line connecting the weld spots, and also lowers the allowable stress in the direction of the tension. In the present situation, these reduced and lowered stresses are allowed within allowable ranges. In particular, for a steel strap of high-carbon material (with an equivalent carbon content of 0.2% or more), the above evils or ill effects of temper hardening due to spot welding are remarkable.

Therefore, a steel strap may be spot-welded in zigzag, square or rectangular modes. Because a spot welding head needs to be compact, however, it has been practically impossible to provide a spot welding head for automatic zigzag, square or rectangular spot welding.

In other words, it has been difficult to devise such a mechanism that can move a spot electrode in a zigzag, square or rectangular mode as stated above in a spot welding head, which has only a relatively narrow space.

Furthermore, the spot electrode of a conventional spot welding head for the foregoing multi-point spot welding is moved by a rotary actuator or the like through a gear mechanism. Therefore, the intervals between the nuggets of spot welding due to gear back lash are not accurate. For example, it was originally necessary for nuggets to have intervals of 10 mm, but their actual intervals were 8 mm and 9 mm. In addition, a spot welding head with this type of mechanism is complicated in structure and therefore expensive, and it is structurally impossible to easily adjust the spot welding intervals from the outside.

OBJECTS OF THE INVENTION

In view of the present situation stated above, it is an object of the present invention to provide a spot welding head which is simple in structure, not only capable of zigzag, square and rectangular spot welding easily, but also conventional spot welding longitudinally at multiple spots and laterally at two or more spots easily, as occasion demands. It is another object to provide a spot welding head with which the spot welding nugget intervals are always accurate and easy to adjust from the outside.

SUMMARY OF THE INVENTION

The spot welding head described hereinafter is a spot welding head for spot-welding the overlapping portions of a steel strap of an automatic binding machine, the head being characterized in that it comprises a spot electrode as one of the electrodes for spot welding, a spot electrode supporter holding the spot electrode on its tip, a base member holding the spot electrode supporter in such a manner that the supporter can swing on a first pin, a frame holding the base member in such a manner that the member can swing on a second pin, guide means for guiding the base member relative to the frame when the member slides longitudinally, slide restraint means for restraining the base member from sliding relative to the frame, swing restraint means for restraining the base member from swinging relative to the frame, a first actuator connected at its one end to the spot electrode supporter for swinging the supporter relative to the base member and bringing it into contact with a steel strap when the strap is spot-welded, and a second actuator connected at its one end to the frame and at its other end to the base member for swinging or sliding the member relative to the frame;

that the base member is slid relative to the frame due to the action of the second actuator to move the spot electrode in the Y-direction over the welding surface, by releasing the slide restraint means and restraining the swing with the swing restraint means;

that the base member is swung on the second pin relative to the frame to move the spot electrode over the welding surface in the X-direction, which is perpendicular to the Y-direction, by releasing the swing restraint means and restraining the base member with the slide restraint means from sliding relative to the frame; and that, by moving the spot electrode in the X- or Y-direction over the welding surface of the steel strap, the head can spot-weld the strap in only the X- or Y-direction, or a combination of the X- and Y-directions.

If the second actuator is operated, with the slide restraint means restraining the base member from sliding longitudinally relative to the frame, and with the swing restraint means released, the base member swings on the second pin relative to the frame, so the spot electrode can be moved in the X-directions. If the second actuator is operated, with the swing restraint means restraining the swing on the second pin, and with the slide restraint means released to make the base member sidable longitudinally relative to the frame, the base member slides longitudinally relative to the frame, while guided by the guide means, so the spot electrode can be moved in the Y-directions. Therefore, as stated above, the spot electrode can be moved over the welding surface of a steel strap in any of the X- and Y-directions. It is consequently possible to spot-weld a steel strap at multiple spots longitudinally, laterally (widthwise) or in a combination of the longitudinal and lateral directions.

According to the present invention, by simply operating the actuators, it is easy to spot-weld a steel strap only longitudinally or in only laterally, or zigzag, square or oblique modes by combining longitudinal welding and lateral welding.

Therefore, in view of the natures of what should be bound, the steel straps used, or the desired binding strength, a single spot welding head can easily spot-weld the straps in various patterns.

Therefore, a single spot welding head is sufficient without providing an exclusive or special purpose spot welding head for longitudinal or lateral welding, dependently on the natures of what should be bound or the steel strap used, as was the case conventionally.

Besides, a spot welding head according to the invention is simple in structure as compared with its functional diversity, and can therefore be smaller than the conventional spot welding heads.

Moreover, the spot welding is accomplished directly through no gear mechanisms, by the direct acting pneumatic cylinders. It is therefore possible to make the spot welding intervals always accurate.

Furthermore, more than anything, zigzag or square spot welding is possible, so it is possible to widen the spot welding intervals. It is therefore possible to prevent the ill effects of temper hardening, which were defects of the conventional multi-point spot welding. Specifically, it was found that the binding strength of a steel strap spot-welded in a zigzag mode at three spots improved by about 20–30%, in comparison with the conventional spot welding at three spots longitudinally in a line, under the same conditions. In addition, it is possible to use high carbon material with a relatively low equivalent carbon content, which was not able to be used in the past because the above ill effects were remarkable.

As described further in the specification, a practical form of the spot welding head further comprises a spot welding head characterized in that it comprises a spot electrode as one of the electrodes for spot welding, a spot electrode supporter holding the spot electrode on its tip, a base member holding the spot electrode supporter in such a manner that the supporter can swing on a first pin, a guide for guiding and holding the base member in such a manner that the member can longitudinally slide, a frame holding the guide in such a manner that the guide can swing on a second pin, slide restraint means for restraining the base member from sliding relative to the guide, swing restraint means for restraining the guide from swinging relative to the frame, a first actuator connected at its one end to the spot electrode supporter for swinging the supporter relative to the base member and bringing it into contact with a steel strap when the strap is spot-welded, and a second actuator connected at its one end to the frame and at its other end to the base member for swinging or sliding the member relative to the frame;

that the base member is slid relative to the frame due to the action of the second actuator to move the spot electrode in the Y-direction over the welding surface, by releasing the slide restraint means and restraining the swing with the swing restraint means;

that the base member is swung on the second pin relative to the frame to move the spot electrode over the welding surface in the X-direction, which is perpendicular to the Y-direction, by restraining the base member with the slide restraint means from sliding relative to the frame, and by releasing the swing restraint means; and that, by moving the spot electrode in the X- or Y-direction over the welding surface of the steel strap, the head can spot-weld the strap in only the X- or Y-direction, or a combination of the X- and Y-directions.

As described further, the slide restraint means of the spot welding head may comprise a pivot pin as the second pin and holes are formed in the frame, the guide and the base member respectively through or in which to move the pivot pin. In such a case, it is possible to realize a slide restraint means with simple structure, and provide an actuator for restraint or release.

As described still further, the pivot pin of the spot welding head may be insertable into and releasable from the holes of the frame, the guide and the base member by a fourth actuator. In such a case, the head can function as an automatic machine.

As described further, the swing restraint means of the spot welding head may comprise a stop pin extending nearly in parallel with the second pin and each of the holes formed in the frame and the guide respectively through or in which to move the stop pin. In such a case, it is possible to realize a swing restraint means with simple structure, and provide an actuator for automatic restraint or release.

As described yet further, the stop pin of the spot welding head of may be insertable into and releasable from the holes of the frame and the guide by a fifth actuator. In such a case, the head can function as an automatic machine.

As described still yet further, the X-direction and Y-direction of the spot welding head may be such that the X-direction may be longitudinal of the steel strap and the Y-direction may be lateral of the steel strap.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 5($b$) is a cross section taken along the line 5$b$—5$b$ of FIG. 5($a$), showing the sliding condition. FIG. 5($c$) is a cross section similar to that of FIG. 5($b$), showing the swinging condition.

FIGS. 7(a)–7(f) are views showing arrangements of spot welding nuggets which can be formed by a spot welding head according to the present invention wherein FIG. 7(a) is a perspective view showing three-spot linear welding which is longitudinal of a steel strap. FIG. 7(b) is a perspective view showing three-spot linear welding which is lateral of the strap. FIG. 7(c) is a perspective view showing three-spot welding which is zigzag on the strap. FIG. 7(d) is a perspective view showing four-point welding which is square on the strap. FIG. 7(e) is a perspective view showing three-spot welding which is oblique on the strap. FIG. 7(f) is a perspective view showing three-spot welding which is zigzag on the strap and reverse to that of FIG. 7(c).

DETAILED DESCRIPTION OF THE ILLUSTRATED EMBODIMENTS

Embodiments of the present invention will be described below with reference to the drawings.

Figure 1:
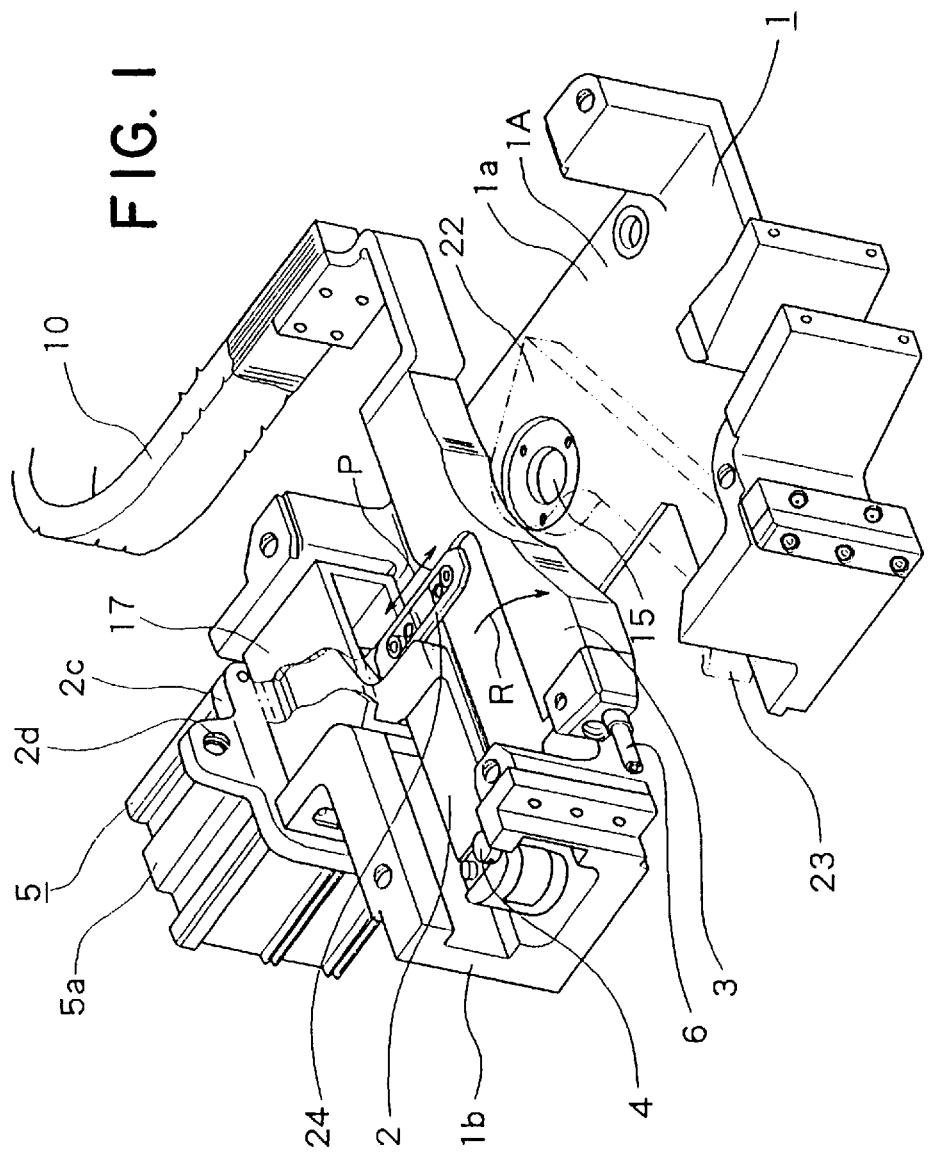
FIG. 1 is an exploded perspective view of a spot welding head according to the present invention from which the upper member of the frame has been removed, showing the structure of the main part of the head.

As shown in FIG. 1, the frame 1 includes a lower member 1A, which has a base surface 1a and side surfaces 1b projecting upwardly from the surface 1a. Mounted movably on the base surface 1a is a base member 2, which is mounted in such a condition that its upper surface is positioned below the tops of the side surfaces 1b. The base member 2 supports a spot electrode supporter 3 through a pin 4, in such a manner that the supporter 3 can swing on the pin 4 in the direction R. The base member 2 has a flange 2c on its left end. Fixed to the flange 2c is the housing 5a of a pneumatic cylinder (first actuator) 5 for moving a spot electrode 6. The rod of the cylinder 5 is connected pivotably at its tip through a connector 24 to a point on the supporter 3 which is spaced from the pin 4, in such a manner that the telescopic motion of the cylinder 5 in the directions P swings the support 3. Fixed to the tip of the supporter 3 is the spot electrode 6. Connected to the root end of the support 3 is a current-carrying conductor 10 for supplying electricity.

Figure 4:
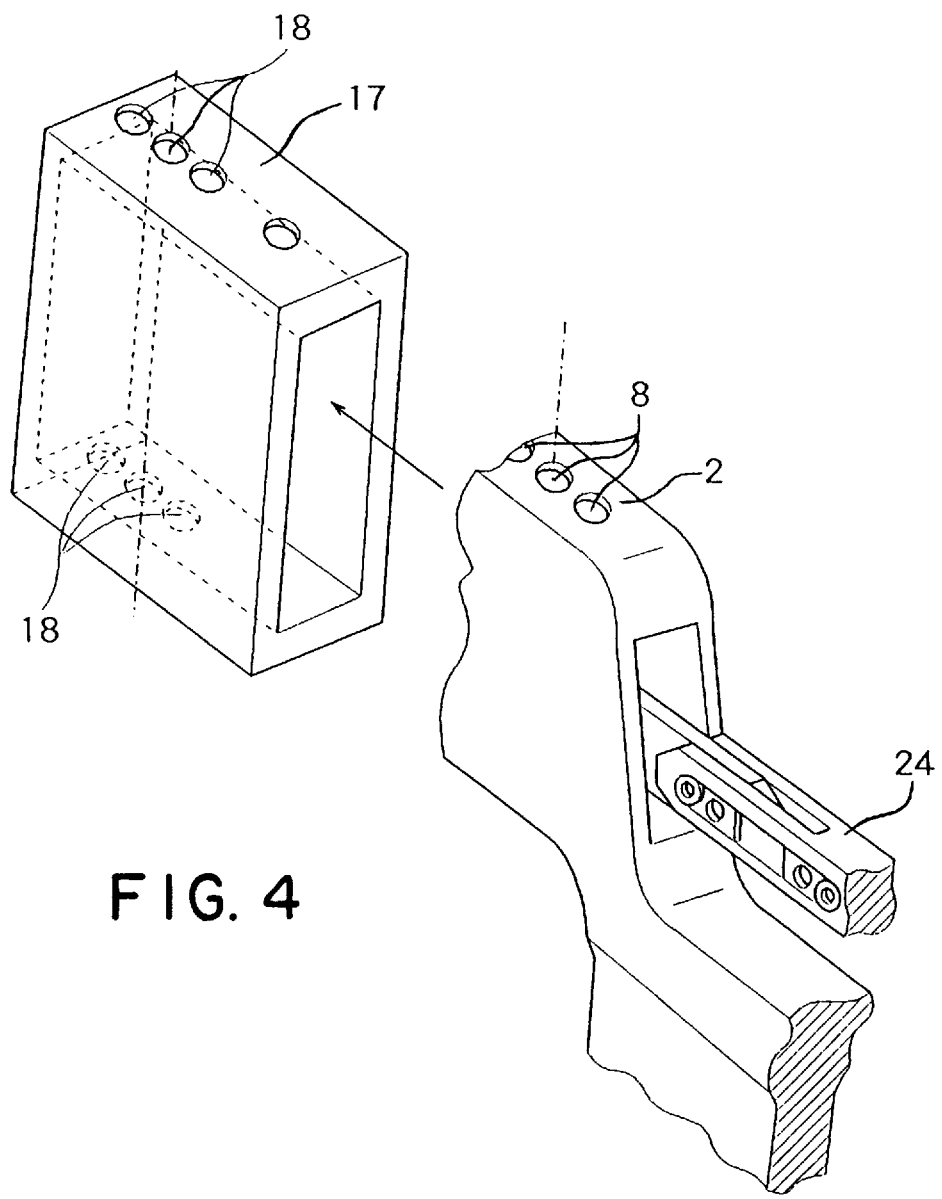
FIG. 4 is an enlarged perspective view showing the guide sleeve and the base member held by the sleeve, with the member moved toward the spot electrode supporter.

The base member 2 is surrounded partially by a guide sleeve 17 serving as a guide means. FIG. 4 shows the sleeve enlarged together with the base member 2 wherein the sleeve 17 is in the form of a rectangular pipe. The sleeve 17 is interposed between the base member 2 and the frame 1 adjacent to the flange 2c. In other words, the base member 2 is held slidably by the sleeve 17.

As shown in cross section in FIG. 6, the side surfaces 1b have through holes 7 extending toward the base member 2. The holes 7 are located near the flange 2c of the base member 2, that is to say, around the guide sleeve 17. The sleeve 17 has through holes 18. The base member 2 has blind holes 8. The holes 18 and 8 are formed at a plurality of places (three in this embodiment) so as to be coaxial with the holes 7. The illustrated pivot pins 14 can move into and out of the through holes 7 and 18 and the blind holes 8. The pins 14 can be inserted and withdrawn by a pneumatic cylinder, not shown, which is supported by the frame 1. As also shown in FIG. 6, another through hole 19 is formed near and in parallel with the through holes 7. The sleeve 17 has another through hole 20 formed so as to be coaxial with the hole 19. The illustrated stop pin 21 can move into and out of the through holes 19 and 20. The pin 21 can be inserted and withdrawn by a pneumatic cylinder, not shown, which is supported by the frame 1.

Figure 2:
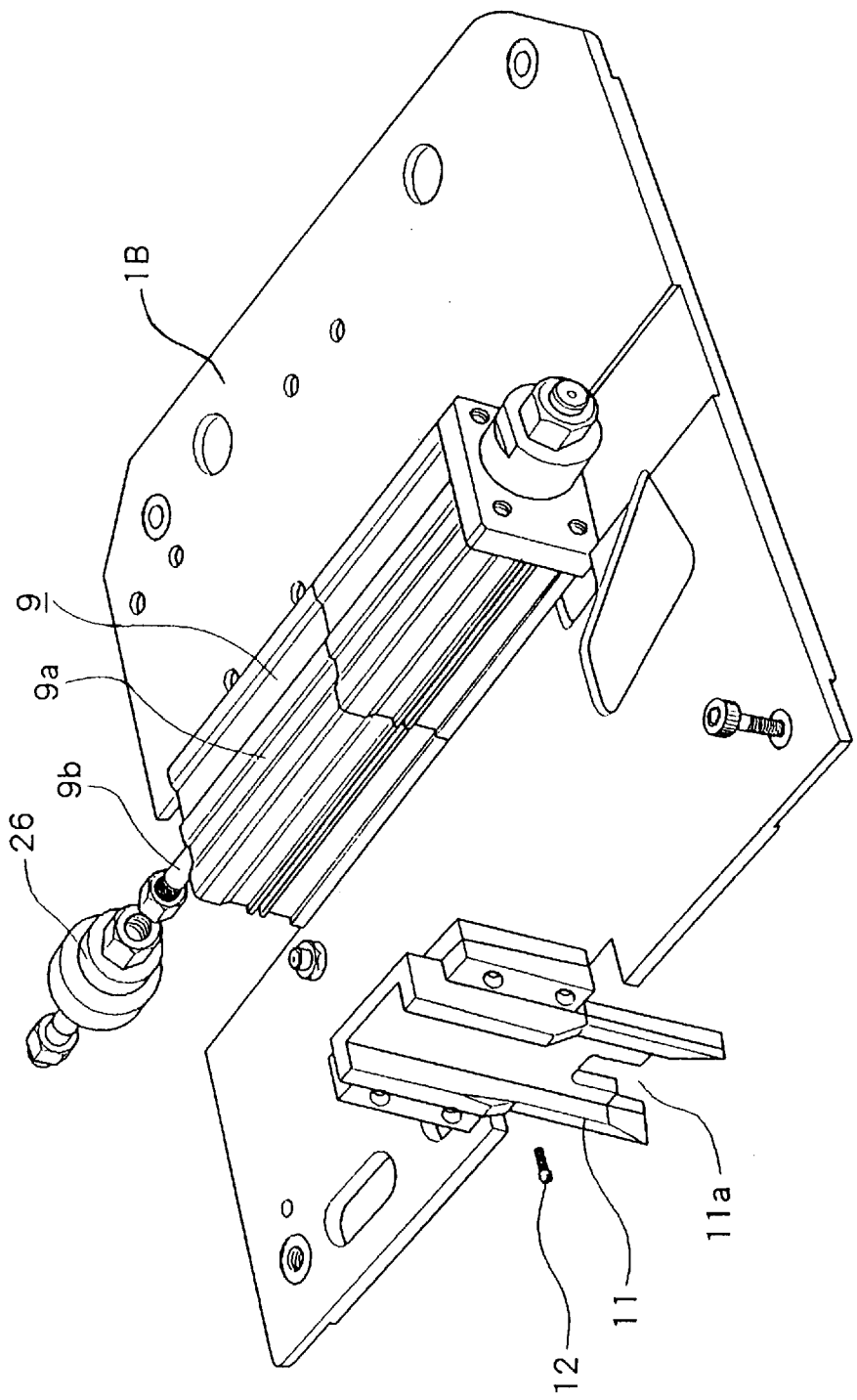
FIG. 2 is a perspective view showing the part of the frame which is fitted over the upper sides of the components shown in FIG. 1.

As shown in FIG. 2, the frame 1 includes another member 1B, which covers the side surfaces 1b of the frame 1 from the upper side in FIG. 1. A three (fixed) position type pneumatic cylinder 9 is fitted on the surface of the member 1B as shown in the drawings. The cylinder 9 operates to move the spot electrode 6 longitudinally and laterally on the welding surface of a steel strap. The cylinder 9 corresponds to the second actuator. In this embodiment, the cylinder 9 includes two pneumatic cylinders coupled together in series, and is constructed so as to obtain three (fixed) positions. Specifically, the housing 9a of the cylinder 9 is fixed to the member 1B. As shown in FIG. 2, the tip of the rod 9b of the cylinder 9 is connected through a spherical joint 26 to a hole 2d (FIG. 1) of the flange 2c of the base member 2.

A holder 11 for guiding and holding a steel strap S (as shown in cross section in FIG. 3) is fixed with a screw 12 to the end of the frame member 1B on the left side in FIG. 2. The holder 11 has a recess 11a formed at its end on the left side in FIG. 2, through which the spot electrode 6 (FIG. 1) passes during spot welding.

Figure 3:
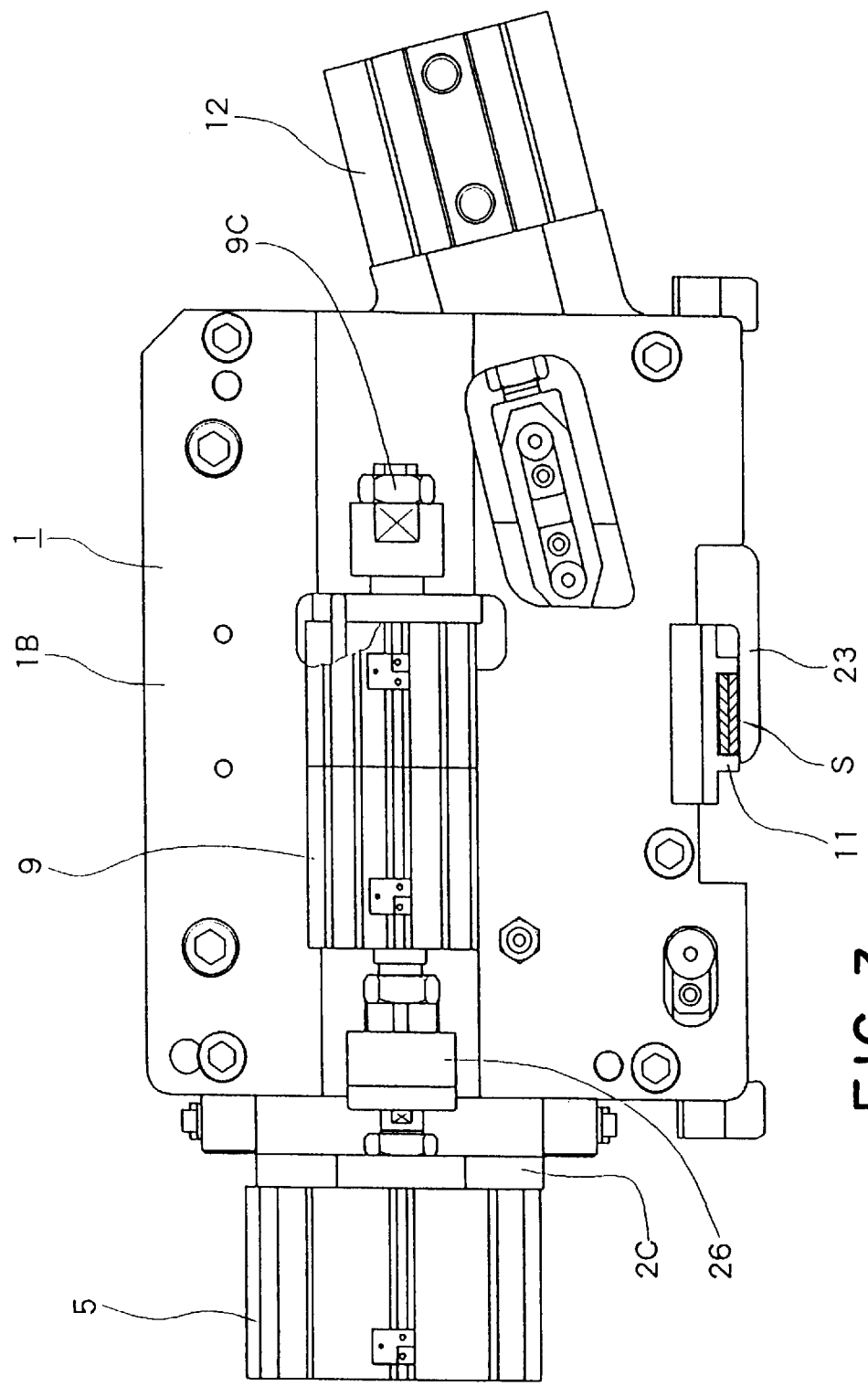
FIG. 3 is a side view of the spot welding head shown in FIGS. 1 and 2, but in assembled condition.

A lower electrode supporter 22 is supported pivotably on a pin 15 on the right side of the spot electrode supporter 3 in FIG. 1, in such a manner that the supporters 3 and 22 face each other right and left. The supporter 22 supports a lower electrode 23 on its lower end. The electrode 23 and the spot electrode 6 face each other right and left. The lower electrode supporter 22 can be swung by a pneumatic cylinder (third actuator) 12, which is shown in FIG. 3.

The spot welding head thus constructed is controlled by a controller so as to operate as follows during spot welding.

Figures 6A, 6B, 6C:
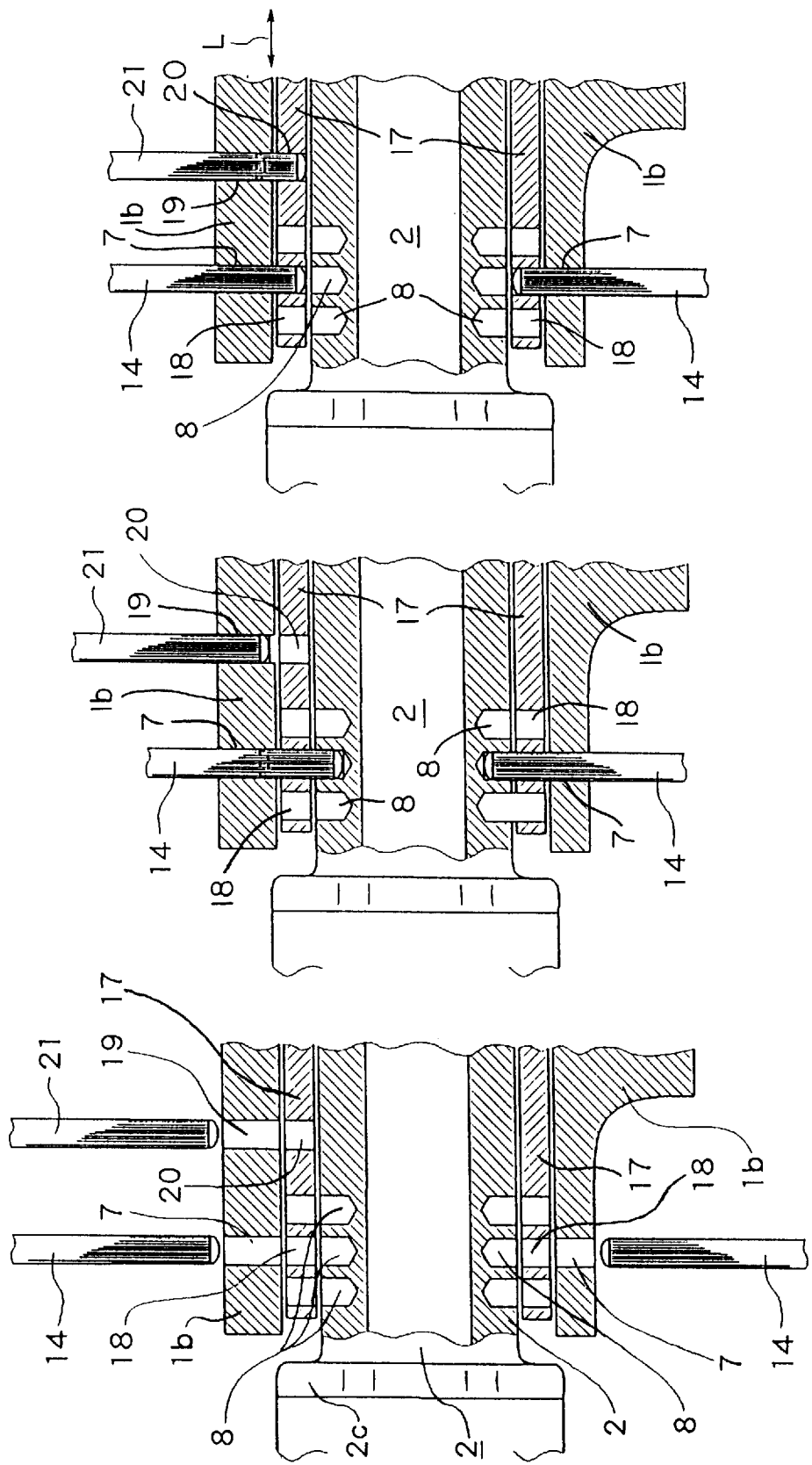
FIGS. 6(a)–6(c) are enlarged partial cross sections showing the frame, guide sleeve and base member restrained by the pivot pins or the stop pin, with the connector omitted.

First, a steel strap S is wound by more than one turn around what should be bound. The wound strap is then tightened. The overlapping portions of the tightened strap are then held in the holder 11. In order to spot-weld the strap longitudinally (in the X-direction) by the control of the controller, the pneumatic cylinder, not shown, is kept extended to keep the pivot pins 14 in the holes 7, 18 and 8, as shown in FIG. 6(b). At the same time, the other pneumatic cylinder (not shown) is retracted to keep the stop pin 21 out of the through hole 20 of the guide sleeve 17. Next, the pneumatic cylinder 12 is operated to position the lower electrode 23, which is fitted on the tip of the lower electrode supporter 22, under the spot electrode 6 through the strap (FIG. 3). At the same time, the pneumatic cylinder 5 is extended to press the spot electrode 6 against the strap surface. Then, electric current is caused to flow for spot welding at the electrode position (see spot welding nugget M1 in FIG. 7(a)).

Figure 7A:
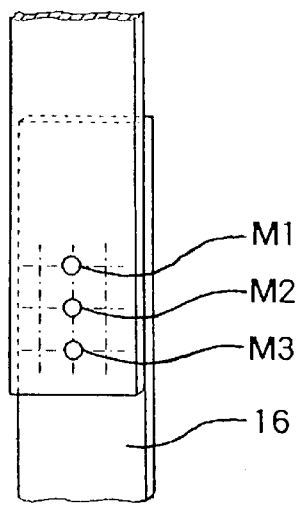

Next, the pneumatic cylinder 5 is retracted to move the spot electrode 6 away from the steel strap surface. Then, by operating the pneumatic cylinder 9 to move it to the next (second) position, the base member 2 (spot electrode supporter 3) pivots on the pivot pins 14 by another predetermined angle. In this condition, the cylinder 5 is extended to again press the spot electrode 6 against the strap surface. In this condition, electric current is caused to flow for spot welding at the electrode position. Eventually, as shown in FIG. 7(a), a second spot welding nugget M2 is formed longitudinally on the strap 16.

Further, the pneumatic cylinder 5 is retracted to move the spot electrode 6 away from the steel strap surface. Then, by operating the pneumatic cylinder 9 to move it to the last (third) position, the base member 2 (spot electrode supporter 3) pivots on the pins 14 by a predetermined angle. In this condition, the cylinder 5 is extended to again press the spot electrode 6 against the strap surface. In this condition, electric current is caused to flow for spot welding at the electrode position. In other words, as shown in FIG. 7(a), the spot electrode 6 moves in the X-direction over the welding surface, and a third spot welding nugget M3 is formed longitudinally (in the X-direction) on the strap 16.

This spot welding head can also weld a steel strap laterally or widthwise in the Y-direction at three spots as follows.

In order to spot-weld a steel strap widthwise at a number of (for example, three) spots, first, the strap S is wound by more than one turn around what should be bound. The wound strap is then tightened. The overlapping portions of the tightened strap are held in the holder 11. In this condition, the pneumatic cylinder, not shown, is retracted to keep the pivot pins 14 out of the blind holes 8 of the base member 2, as shown in FIG. 6(c). As a result, the base member 2 can move relative to the frame 1 in the directions L in FIG. 6(c). At the same time, the other pneumatic cylinder, not shown, is extended to keep the stop pin 21 in the through hole 20 of the guide sleeve 17. Next, the pneumatic cylinder 12 is operated to position the lower electrode 23, which is fitted on the tip of the lower electrode supporter 22, under the spot electrode 6 through the steel strap. At the same time, the pneumatic cylinder 5 is operated to press the spot electrode 6 against the strap surface. In this condition, electric current is caused to flow for spot welding at the electrode position (see spot welding nugget M4 in FIG. 7(b)).

Next, the pneumatic cylinder 5 is retracted to move the spot electrode 6 away from the steel strap surface. Then, by operating the pneumatic cylinder 9 to move to the next (second) position, the base member 2 (spot electrode supporter 3) slides relative to the frame 1 by a predetermined distance in the direction L (the same as directions P), while guided by the guide sleeve 17. In this condition, the cylinder 5 is extended to again press the spot electrode 6 against the strap surface. In this condition, electric current is caused to flow for spot welding at the electrode position.

Figure 7D:
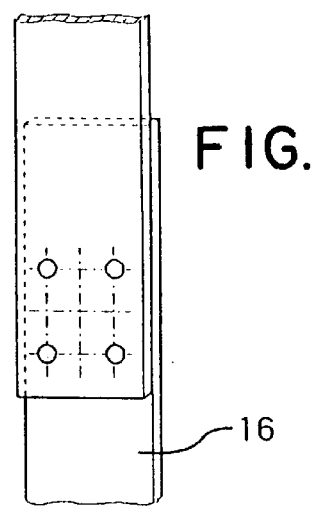
Figure 7B:
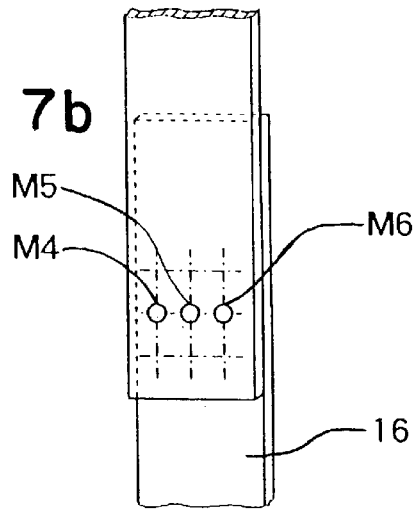

Eventually, as shown in FIG. 7(b), a second spot welding nugget M5 is formed laterally or widthwise in the Y-direction on the strap 16.

Further, the pneumatic cylinder 5 is retracted to move the spot electrode 6 away from the steel strap surface. Then, by operating the pneumatic cylinder 9 to further move it to the last (third) position, the base member 2 (spot electrode supporter 3) slides relative to the frame 1 by another predetermined distance in the direction L, while guided by the guide sleeve 17. In this condition, the cylinder 5 is extended to again press the spot electrode 6 against the strap surface. In this condition, electric current is caused to flow for spot welding at the electrode position. That is to say, as shown in FIG. 7(b), the spot electrode 6 moves over the welding surface in the Y-direction, and a third spot welding nugget M6 is formed laterally or widthwise in the Y-direction on the strap 16.

Figure 7E:
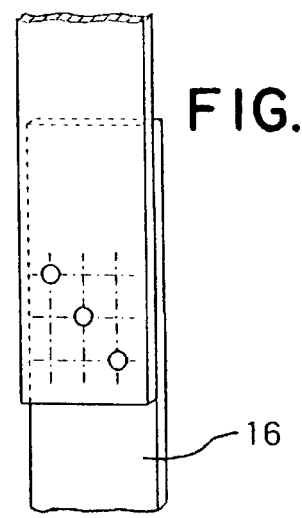
Figure 7C:
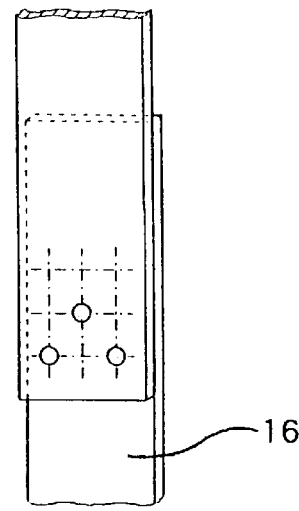
Figure 7F:
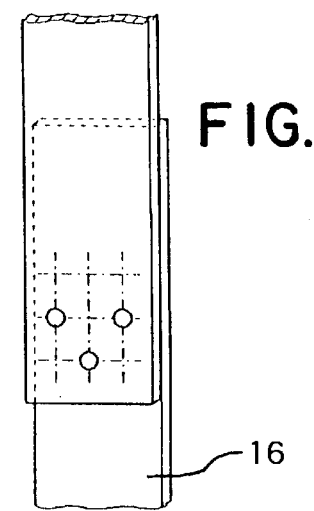

By properly combining the longitudinal and lateral movements of the steel strap, it is easy to spot-weld the strap in a zigzag manner as shown in FIGS. 7(c) and 7(f), square or rectangularly as shown in FIG. 7(d), or obliquely at three spots as shown in FIG. 7(e).

The pneumatic cylinders are used as the actuators of the above embodiment. Instead, hydraulic cylinders or electric, pneumatic or hydraulic motors may be used.

By adjusting a screw 9c (FIG. 3) of the pneumatic cylinders 9, and fitting the rod of the one of the cylinders 9 adjacent to the pneumatic cylinder 5 with a stopper which can be adjusted positionally to adjust the extended lengths of the cylinders 9, it is possible to adjust the intervals between the nuggets on the steel strap freely from the outside.

Figure 5A:
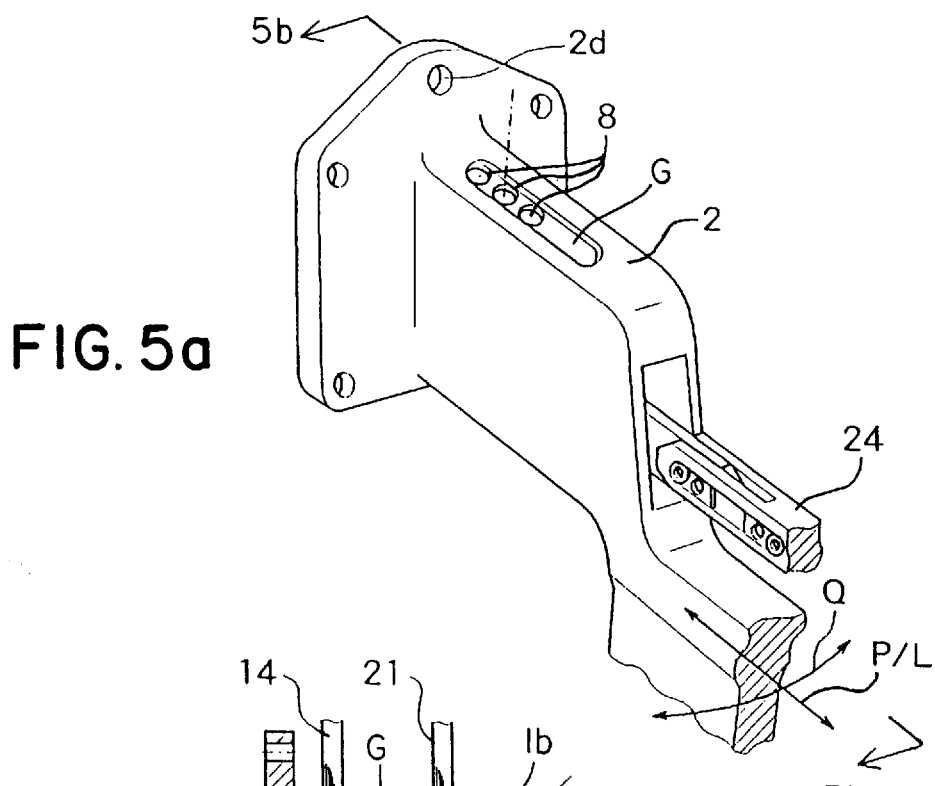
FIGS. 5($a$)–5($c$) are views showing the construction and operation of another embodiment (without a guide sleeve) of the present invention wherein FIG. 5($a$) is an enlarged perspective view showing the construction of the base member and adjacent parts of a spot welding head according to this embodiment.
Figure 5B:
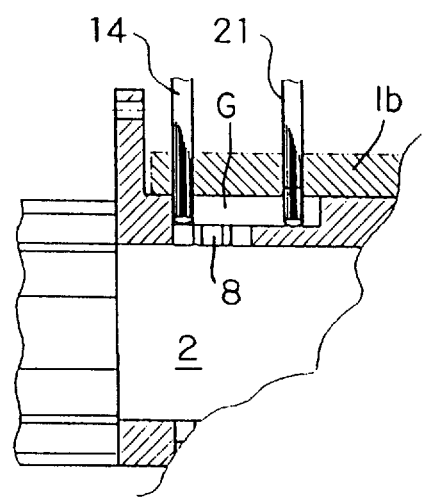
Figure 5C:
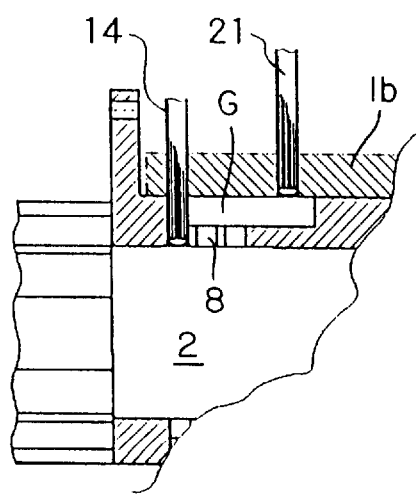

The guide sleeve 17 is used as the means for guiding the sliding movement of the base member 2 of the above embodiment. Instead, as shown in FIG. 5(a), the base member 2 may have a guide groove G formed in its upper side. The through holes 8 are formed in a line within the groove G. Consequently, as shown in FIG. 5(b), the sliding movement in the directions L (FIG. 5(a)) can be guided by the pivot pins 14 and the stop pin 21. Besides, as shown in FIG. 5(c), the base member 2 can pivot on the stop pin 14 in the directions Q (FIG. 5(a)). That is to say, it is possible to guide the sliding movement by providing a well known guide mechanism for longitudinal guiding, without providing a guide member such as the sleeve 17.

Obviously, many modifications and variations of the present invention are possible in light of the above teachings. It is therefore to be understood that within the scope of the appended claims, the present invention may be practiced otherwise than as specifically described herein.

I claim:

1. A spot welding head for spot-welding operations, comprising:

a frame member, a base member mounted upon said frame member;

a spot electrode mounted upon said base member;

single actuating means for moving said base member, and said spot electrode mounted thereon, relative to said frame member;

first means operatively connecting said base member and said frame member for permitting said base member, and said spot electrode mounted thereon, to be moved, by said single actuating means, in a first pivotable mode with respect to said frame member such that said spot electrode is effectively moved along a workpiece in a first direction; and second means operatively connecting said base member and said frame member for permitting said base member, and said spot electrode mounted thereon, to be moved, by said single actuating means, in a second linear mode with respect to said frame member such that said spot electrode is effectively moved along a workpiece in a second direction perpendicular to said first direction, whereby depending upon the operation of said first and second means, said spot electrode can selectively undergo movement with respect to a workpiece in any one of several different modes comprising said first mode, said second mode, and a combination of said first and second modes.

2. The spot welding head as set forth in claim 1, further comprising:

a guide sleeve mounted upon said frame member and within which a portion of said base member is disposed;

first pin means selectively movable between a first position at which said first pin means operatively connects said frame member, said guide sleeve, and said base member, and a second position at which said first pin means operatively connects said frame member and said guide sleeve; and second pin means selectively movable between a first position at which said second pin means is operatively disconnected from said guide sleeve and said base member, and a second position at which said second pin means operatively connects said frame member and said guide sleeve, said first means operatively connecting said base member and said frame member for permitting said base member, and said spot electrode mounted thereon, to be moved in said first pivotable mode with respect to said frame member comprises said first pin means disposed at said first position while said second pin means is also disposed at said first position whereby said guide sleeve and said base member will undergo pivotable movement with respect to said frame member and about an axis defined by said first pin means; and said second means operatively connecting said base member and said frame member for permitting said base member, and said spot electrode mounted thereon, to be moved in said second linear mode with respect to said frame member comprises said first pin means disposed at said second position while said second pin means is also disposed at said second position whereby said base member will undergo linear movement with respect to said frame member and said guide sleeve.

3. The spot welding head as set forth in claim 2, further comprising:

first aligned hole means defined within said frame member, said guide sleeve, and said base member for accommodating said first pin means; and second aligned hole means respectively defined within said frame member and said guide sleeve for accommodating said second pin means, whereby when said first pin means is disposed within said first aligned hole means of said frame member, said guide sleeve, and said base member while said second pin means is withdrawn from said second hole means of said guide sleeve, said guide sleeve and said base member are permitted to undergo said pivotable movement with respect to said frame member about said axis defined by said first pin means and are prevented from undergoing linear movement with respect to said frame member, whereas when said first pin means is disposed within said first hole means of said frame member and said guide sleeve while said second pin means is also disposed within said second hole means of said frame member and said guide sleeve, said base member is permitted to undergo linear movement with respect to said guide sleeve and said frame member but said guide sleeve is prevented from undergoing pivotable or linear movement with respect to said frame member.

4. The spot welding head as set forth in claim 1, wherein:

said first means operatively connecting said base member and said frame member comprises means for permitting said pivotable movement of said base member with respect to said frame member and for preventing linear movement of said base member with respect to said frame member; and said second means operatively connecting said base member and said frame member comprises means for permitting said linear movement of said base member with respect to said frame member and for effectively preventing said pivotable movement of said base member with respect to said frame member.

5. The spot welding head as set forth in claim 4, wherein:

a guide sleeve is mounted upon said frame member for housing a portion of said base member;

first pin means is selectively movable between a first position at which said first pin means operatively connects said frame member, said guide sleeve, and said base member, and a second position at which said first pin means operatively connects said frame member and said guide sleeve;

second pin means is selectively movable between a first position at which said second pin means is operatively disconnected from said guide sleeve and said base member, and a second position at which said second pin means operatively connects said frame member and said guide sleeve;

said first means operatively connecting said base member and said frame member comprises said first pin means disposed at said first position while said second pin means is disposed at its first position; and said second means operatively connecting said base member and said frame member comprises said first pin means disposed at said second position while said second pin means is disposed at its second position.

6. The spot welding head as set forth in claim 5, further comprising:

first aligned hole means respectively defined within said frame member, said guide sleeve, and said base member for accommodating said first pin means; and second aligned hole means respectively defined within said frame member and said guide sleeve for accommodating said second pin means, whereby when said first pin means is disposed within said first aligned hole means of said frame member, said guide sleeve, and said base member while said second pin means is withdrawn from said second hole means of said guide sleeve, said guide sleeve and said base member are prevented from undergoing linear movement with respect to said frame member but are permitted to undergo pivotable movement with respect to said frame member, whereas when said first pin means is disposed within said first hole means of said frame member and said guide sleeve while said second pin means is likewise disposed within said second hole means of said frame member and said guide sleeve, said guide sleeve is prevented from undergoing either linear or pivotable movement with respect to said frame member but said base member is permitted to undergo linear movement with respect to said guide sleeve and said frame member.

7. The spot welding head as set forth in claim 4, wherein:

a linear guide groove is defined within said base member;

first hole means is defined within said base member;

second hole means is defined within said frame member; and pin means is selectively movable between a first position at which said pin means is disposed within both said first and second hole means of said base member and said frame member so as to comprise said first means operatively connecting said base member and said frame member so as to permit said pivotable movement of said base member with respect to said frame member while preventing linear movement of said base member with respect to said frame member, and a second position at which said pin means is disposed within said second hole means of said frame member and said linear guide groove of said base member so as to comprise said second means operatively connecting said base member and said frame member so as to permit said linear movement of said base member with respect to said frame member while preventing pivotable movement of said base member with respect to said frame member.

8. The spot welding head as set forth in claim 1, further comprising:

a spot electrode supporter mounted upon said base member and mounting said spot electrode thereon; and means for moving said spot electrode supporter between first extended and second retracted positions so as to in turn move said spot electrode into engagement with, and to retract said spot electrode away from, a workpiece.

9. The spot welding head as set forth in claim 1, wherein:

said first and second directions are mutually orthogonal X-Y directions of a Cartesian coordinate system.

10. The spot welding head as set forth in claim 9, wherein:

said X-Y Cartesion coordinate system defines a grid system comprising at least six point locations; and said single actuating means can move said base member, and said spot electrode mounted thereon, to any one of said at least six point locations of said grid system, depending upon the operation of said first and second means operatively connecting said base member and said frame member, such that said spot electrode can spot weld a workpiece in either one of a linear pattern oriented in said X-direction, a linear pattern oriented in said Y-direction, a rectangular pattern, a zigzag pattern, or a linear pattern having a predetermined slope with respect to said X-Y Cartesian coordinate system.

11. The spot welding head as set forth in claim 1, further comprising:

workpiece holder means mounted upon said frame member for fixedly securing a workpiece relative to said spot electrode.

12. The spot welding head as set forth in claim 11, wherein:

recess means is provided within said workpiece holder means for permitting said spot electrode to pass therethrough into engagement with a workpiece fixedly secured within said workpiece holder means so as to perform a spot welding operation upon a workpiece.

* * * * *